(12) United States Patent
Serlie (10) Patent No.: US 9,142,017 B2
(45) Date of Patent: Sep. 22, 2015

(54) TNM CLASSIFICATION USING IMAGE OVERLAYS

(75) Inventor: Iwo Willem Oscar Serlie, Noord Brabant (NL)

(73) Assignee: Koninklijke Philips N.V., Eindhoven (NL)

(*) Notice: Subject to any disclaimer, the term of this patent is extended or adjusted under 35 U.S.C. 154(b) by 111 days.

(21) Appl. No.: 13/976,033

(22) PCT Filed: Dec. 14, 2011

(86) PCT No.: PCT/IB2011/055653
§ 371 (c)(1),
(2), (4) Date: Jun. 26, 2013

(87) PCT Pub. No.: WO2012/090106
PCT Pub. Date: Jul. 5, 2012

(65) Prior Publication Data
US 2013/0279777 A1    Oct. 24, 2013

(30) Foreign Application Priority Data
Dec. 29, 2010 (EP) .................................. 10197267

(51) Int. Cl.
*G06K 9/00* (2006.01)
*G06T 7/00* (2006.01)
*G06T 11/20* (2006.01)

(52) U.S. Cl.
CPC ............ *G06T 7/0014* (2013.01); *G06T 7/0012* (2013.01); *G06T 11/206* (2013.01); *G06T 2200/24* (2013.01); *G06T 2207/10072* (2013.01); *G06T 2207/10104* (2013.01); *G06T 2207/10108* (2013.01); *G06T 2207/30096* (2013.01)

(58) Field of Classification Search
None
See application file for complete search history.

(56) References Cited

U.S. PATENT DOCUMENTS 8,551,425 B2 * 10/2013 Goldkorn et al. ............. 422/534
2006/0257369 A1 * 11/2006 Kessler et al. ................ 424/93.2
2009/0234626 A1    9/2009 Yu et al.

(Continued)

FOREIGN PATENT DOCUMENTS

EP         1614069 B1    7/2008
WO    2010086771 A1    8/2010

OTHER PUBLICATIONS

Tumor-Node-Metastasis (TNM) Classification of Malignant Tumours 7th edition, ISMB: 978-1-4443-3241-4, Dec. 2009. ISBN: 978-1-4443-3241-4.

(Continued)

*Primary Examiner* — Nancy Bitar (57) ABSTRACT

A tumor of interest is classified based on 3-dimensional image data for visualizing the tumor. The system includes an overlay data structure (OL) for computing a TNM (Tumor-Node-Metastasis) overlay for displaying in a tumor image computed from the image data. The TNM overlay includes TNM information for determining the stage of the tumor. An overlay unit (U10) computes the TNM overlay based on the overlay data structure, and positions the TNM overlay on the tumor image. The size of the TNM overlay is based on the scale of the computed tumor image. By making the size of the TNM overlay dependent on the scale of the tumor image, the ratio of the distance between two locations on the positioned TNM overlay to the distance between two locations in the computed tumor image is substantially constant, i.e., substantially independent of the visualization of the image data.

15 Claims, 7 Drawing Sheets

(56) References Cited

U.S. PATENT DOCUMENTS

2012/0123186 A1* 5/2012 Kessler et al. .................. 600/1
2014/0038271 A1* 2/2014 Goldkorn et al. .......... 435/283.1

OTHER PUBLICATIONS

Krueger, A. et al. "Interactive Visualization for Neck-Dissection Planning". Proceedings of the Eurographics/IEEE VGTC Symposium on Visualization, Jun. 1-3, 2005, pp. 223-230.

Yoo, D.S. et al. "The role of Adaptive and Functional Imaging Modalities in Radiation Therapy: Approach and Application from a Radiation Oncology Perspective". Seminars in Ultrasound, CT and MR, Grune and Straton, Orlando, FL, vol. 31, No. 6, Dec. 1, 2010, pp. 444-461, ISSN: 0887-2171.

Baldwin, D.R. "Lung cancer: investigation and staging". ScienceDirect. vol. 36, No. 3, Feb. 20, 2008. pp. 155-161.

Steenbakkers RJ. "Reduction of observer variation using matched CT-PET for lung cancer delineation: A three-dimention analysis". International Journal of Radiation: Oncology Biology Physics, Pergamon Press, vol. 64, No. 2, Feb. 1, 2006, pp. 435-448.

Aggarwal P. et al. "An efficient visualization and segmentation of lung CT scan images for early diagnosis of cancer". Proceedings of the National Conference on Computational Instrumentation, India, Mar. 19-20, 2010, pp. 100-104.

Bellangan, C. et al. "Lung Segmentation and Tumor Detection from CT Thorax Volumes of FDG PET-CT Scans by Template Registration and Incorporation of Functional Information". 2008 IEEE Nuclear Science Symposium Conference Record. pp. 5349-5353.

Fornvik, D. et al. Breast tomosynthesis: Accuracy of tumor measurement compared with digital mammography and ultrasonography. Informa Healthcare—Acta Radiologica—51(3):240. Apr. 2010.

Jager, G. et al. "Local staging of prostate cancer with Endorectal MR Imaging: correlation with Histopathology". AJR:166, Apr. 1996, pp. 845-852.

* cited by examiner

TNM CLASSIFICATION USING IMAGE OVERLAYS

FIELD OF THE INVENTION

The invention relates to classifying tumors using image overlays.

BACKGROUND OF THE INVENTION

The AJCC (American Joint Committee on Cancer) and UICC (International Union Against Cancer) have chosen staging by TNM (Tumor-Node-Metastasis) classification to define cancer (*TNM Classification of Malignant Tumours* 7th edition, ISBN: 978-1-4443-3241-4, December 2009), hereinafter referred to as Ref. 1. The TNM system describes how to classify the extent of cancer based on morphological attributes of malignant tumors which are thought to influence disease prognosis (e.g. the size of the primary tumor or distance of the tumor to other structures). To stage a tumor, clinicians, e.g., physicians, are required to measure the greatest dimension of a tumor (see FIG. 1) and, subsequently, apply TNM staging rules to classify the tumor (see Table 1). This is prone to error, time consuming and inconvenient.

SUMMARY OF THE INVENTION

It would be advantageous to have a system capable of simplifying the task of classifying malignant tumors.

Thus, in an aspect, the invention provides a system for classifying a tumor of interest based on 3-dimensional image data for visualizing the tumor of interest, the system comprising:

an overlay data structure for computing a TNM overlay for displaying in a tumor image computed from the 3-dimensional image data, wherein the TNM overlay comprises TNM information for determining the stage of the tumor of interest; and an overlay unit for computing the TNM overlay based on the overlay data structure and positioning the TNM overlay on the tumor image, wherein the size of the TNM overlay is based on the scale of the computed tumor image.

By making the size of the TNM overlay dependent on the scale of the tumor image, the ratio of the distance between two locations on the positioned TNM overlay to the distance between two locations in the computed tumor image is substantially constant, i.e., substantially independent of the visualization of the image data. Thus, the TNM overlay superimposed on the tumor image allows a clinician to quickly visually evaluate and rank the tumor of interest, e.g., a malignant tumor, according to the TNM classification.

In an embodiment of the system, the overlay data structure represents a 3-dimensional geometrical structure, the overlay unit is arranged for positioning the 3-dimensional geometrical structure in the 3-dimensional image data volume, the linear sizes of the 3-dimensional geometrical structure are based on the scale of the 3-dimensional image data in all dimensions, and the TNM overlay is computed based on the 3-dimensional geometrical structure and the tumor image. By making the linear sizes of the 3-dimensional geometrical structure dependent on the 3-dimensional image data scale in all dimensions, the ratio of the distance between two locations on the positioned 3-dimensional geometrical structure to the distance between two locations in the 3-dimensional image data volume is substantially constant, i.e., substantially independent of the visualization of the image data.

In an embodiment of the system, the overlay unit may be arranged for mapping data representing the 3-dimensional geometrical structure into the image data volume and for merging the mapped data with the image data, thereby creating integrated image-overlay data, and the overlay unit may be further arranged for computing an image from the integrated image-overlay data, which therefore visualizes the tumor of interest and the TNM overlay.

A person skilled in the art will understand that the scale of two objects or object details shown in a 2-dimensional image rendered from 3-dimensional image data may be different. For example, this is the case when each object or object detail is at a different distance from the viewing plane and the image is rendered by means of a linear perspective projection, for example. The condition that "the size of the TNM overlay is based on the scale of the computed tumor image" should be interpreted in this context.

It is to be noted that once the 3-dimensional image data is positioned in the image data volume, i.e., with respect to the image data, any change of the tumor image may result in a corresponding change of the TNM overlay. A change of the tumor image may be caused by transforming, e.g. translating or rotating, the image data, or by choosing another way of (i.e., another rendering algorithm for) computing the tumor image. A person skilled in the art will know many ways of computing the tumor image.

In an embodiment of the system, the position of the 3-dimensional geometrical structure is computed based on a user input and/or segmentation of the 3-dimensional image data. For example, a segmentation algorithm may be used for computing the center of mass of the segmented tumor of interest. The computed center of mass may be used for positioning the 3-dimensional geometrical structure in the image data volume. Optionally, the segmentation algorithm may be further used for computing principal axes of the inertia tensor of the segmented tumor of interest and the computed principal axes can be used for orienting the 3-dimensional geometrical structure in the image data volume. Alternatively, the user may navigate through a stack of images comprised in the image data to choose and input the position of the 3-dimensional geometrical structure, e.g. by defining positions of landmarks of the 3-dimensional geometrical structure with respect to the image.

In an embodiment of the system, the overlay unit is further arranged for repositioning the 3-dimensional geometrical structure with respect to the 3-dimensional image data, based on a user input. Repositioning involves translations and/or rotations of the 3-dimensional geometrical structure with respect to the 3-dimensional image data. After repositioning the 3-dimensional geometrical structure with respect to the 3-dimensional image data, the overlay unit is arranged for updating the position of the TNM overlay according to the new position of the 3-dimensional geometrical structure with respect to the 3-dimensional image data.

In an embodiment of the system, the 3-dimensional geometrical structure comprises a plurality of concentric spheres or a plurality of concentric cubes. The system is arranged for computing the tumor image from a thin data slice comprising the center of the spheres or cubes. The TNM overlay may then comprise a plurality of concentric circles or a plurality of concentric rectangles, respectively.

In an embodiment, the system further comprises a segmentation unit for computing a tumor overlay for indicating the tumor of interest on the tumor image. For example, the tumor boundaries can be computed using the method described in EP 1614069 B1, entitled Volume Measurements in 3d Datasets, and the tumor outline based on the computed tumor boundaries may be shown in the tumor image to facilitate interpretation of the tumor image.

In an embodiment of the system, the overlay unit is further arranged for adapting the TNM overlay, based on a property of the 3-dimensional image data. For example, the line thickness may be determined by the signal-to-noise ratio in the computed tumor image, or the gray value of each pixel displaying the TNM overlay may be determined by the average gray value of pixels of the tumor image which are substantially comprised in a circular surrounding of the TNM overlay pixel.

In an embodiment of the system, the overlay unit is further arranged for adapting the TNM overlay, based on the type of the tumor of interest. Different tumors may require different TNM rules. For example, TNM rules required by a lung tumor and a breast tumor are different. These TNM rules may be reflected in the TNM overlay. Possibly, the rules can be reflected in the 3-dimensional geometrical structure for computing the TNM overlay. For example, different 3-dimensional geometrical structures may have different shapes or sizes.

In an embodiment, the system further comprises a tumor unit for indicating the stage of the tumor of interest in the tumor image, based on a user input or segmentation of the 3-dimensional image data. For example, a contour defining the stage of the tumor of interest may be red or may be blinking.

In an embodiment of the system, the tumor unit is further arranged for communicating the size of the tumor of interest in the tumor image, based on a user input and/or segmentation of the 3-dimensional image data. The size as well as any other relevant information relating to the tumor of interest derived from a user input and/or analysis of the 3-dimensional image data may be displayed in a text box placed such that it does not obscure the view of the tumor of interest and the TNM overlay.

In a further aspect, an image acquisition apparatus comprising the system of the invention system is provided.

In a further aspect, a workstation comprising the system of the invention is provided.

In a further aspect, the invention provides a method of classifying a tumor of interest based on 3-dimensional image data for visualizing the tumor of interest, wherein the method is arranged for employing an overlay data structure for computing a TNM overlay for displaying in a tumor image computed from the 3-dimensional image data, wherein the TNM overlay comprises TNM information for determining the stage of the tumor of interest, the method comprising an overlay step for computing the TNM overlay based on the overlay data structure and for positioning the TNM overlay on the tumor image, wherein the size of the TNM overlay is based on the scale of the computed tumor image.

In an implementation of the method, the overlay data structure represents a 3-dimensional geometrical structure, the overlay step is arranged for positioning the 3-dimensional geometrical structure in the image data volume, the linear sizes of the 3-dimensional geometrical structure are based on a linear scale of the 3-dimensional image data in all dimensions, and the TNM overlay is computed based on the 3-dimensional geometrical structure and the tumor image.

In a further aspect, the invention provides a computer program product to be loaded by a computer arrangement, comprising instructions for classifying a tumor of interest using a TNM (Tumor-Node-Metastasis) overlay for displaying in a tumor image computed from 3-dimensional image data, wherein the TNM overlay comprises TNM information for determining the stage of the tumor of interest, the computer arrangement comprising a processing unit and a memory, the computer program product, after being loaded, providing said processing unit with the capability to carry out steps of the method of the invention.

It will be appreciated by those skilled in the art that two or more of the above-mentioned embodiments, implementations, and/or aspects of the invention may be combined in any way deemed useful.

Modifications and variations of the system, of the workstation, of the image acquisition apparatus, of the method, and/or of the computer program product, which correspond to the described modifications and variations of the system or of the method, can be carried out by a person skilled in the art on the basis of the description.

A person skilled in the art will appreciate that an image dataset in the claimed invention may be a 2-dimensional (2-D), 3-dimensional (3-D) or 4-dimensional (4-D) image dataset, acquired by various acquisition modalities such as, but not limited to, X-ray Imaging, Computed Tomography (CT), Magnetic Resonance Imaging (MRI), Ultrasound (US), Positron Emission Tomography (PET), Single Photon Emission Computed Tomography (SPECT), and Nuclear Medicine (NM).

The invention is defined in the independent claims. Advantageous embodiments are defined in the dependent claims.

BRIEF DESCRIPTION OF THE DRAWINGS

These and other aspects of the invention are apparent from and will be elucidated by means of implementations and embodiments described hereinafter and with reference to the accompanying drawings, in which.

Identical reference numerals are used to denote similar parts throughout the Figures.

DETAILED DESCRIPTION OF EMBODIMENTS

Figure 2:
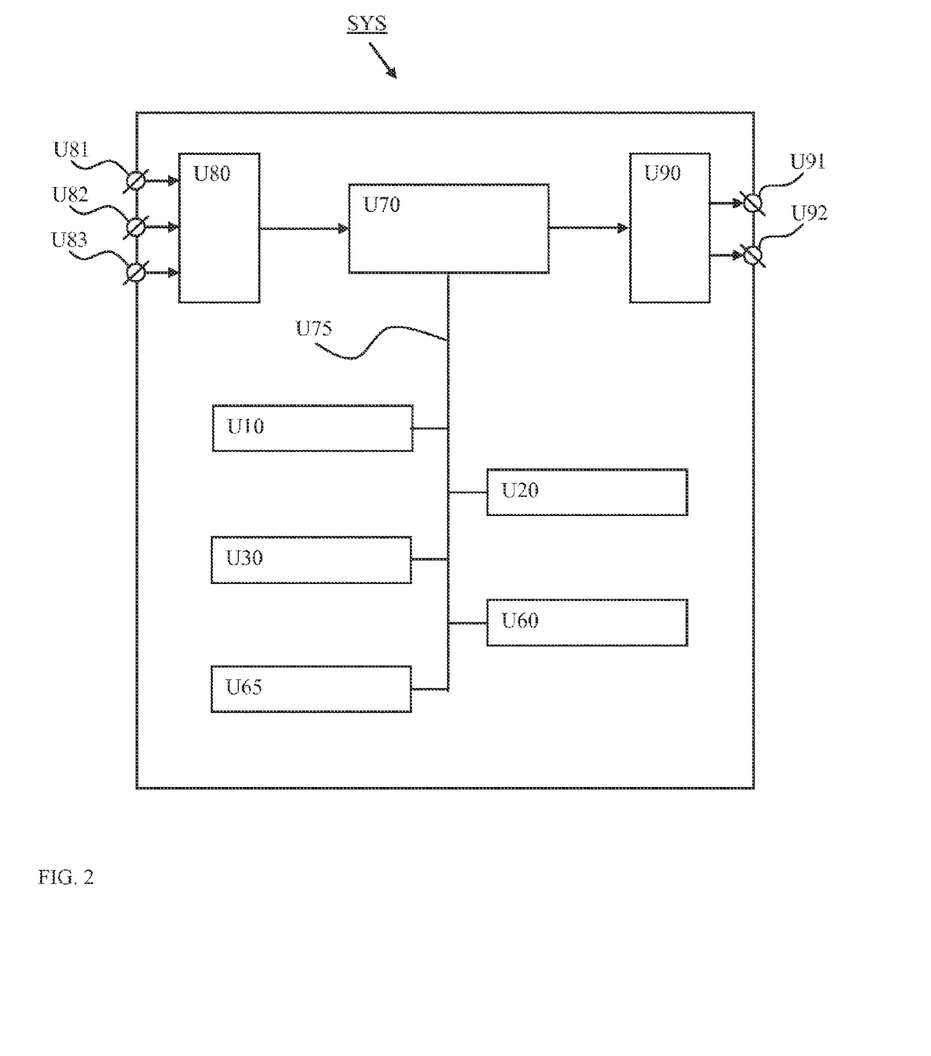
FIG. 2 shows a block diagram of an exemplary embodiment of the system.

FIG. 2 schematically shows a block diagram of an exemplary embodiment of the system SYS for classifying a tumor of interest based on 3-dimensional image data for visualizing the tumor of interest, the system comprising:

an overlay data structure OL for computing a TNM overlay for displaying in a tumor image computed from the image data, wherein the TNM overlay comprises TNM information for determining the stage of the tumor of interest; and an overlay unit U10 for computing the TNM overlay based on the overlay data structure OL and positioning the TNM overlay on the tumor image, wherein the size of the TNM overlay is based on the scale of the computed tumor image.

The exemplary embodiment of the system SYS further comprises:

a segmentation unit U20 for computing a tumor overlay for indicating the tumor of interest on the tumor image;

a tumor unit (U30) for:

indicating the stage of the tumor of interest in the tumor image, based on a user input or segmentation of the 3-dimensional image data; and/or communicating the size of the tumor of interest in the tumor image, based on a user input and/or segmentation of the 3-dimensional image data;

a control unit U60 for controlling the work of the system SYS;

a user interface U65 for communication between the user and the system SYS; and a memory unit U70 for storing data.

In an embodiment of the system SYS, there are three input connectors U81, U82 and U83 for the incoming data. The first input connector U81 is arranged to receive data coming in from a data storage means such as, but not limited to, a hard disk, a magnetic tape, a flash memory, or an optical disk. The second input connector U82 is arranged to receive data coming in from a user input device such as, but not limited to, a mouse or a touch screen. The third input connector U83 is arranged to receive data coming in from a user input device such as a keyboard. The input connectors U81, U82 and U83 are connected to an input control unit U80.

In an embodiment of the system SYS, there are two output connectors U91 and U92 for the outgoing data. The first output connector U91 is arranged to output the data to a data storage means such as a hard disk, a magnetic tape, a flash memory, or an optical disk. The second output connector U92 is arranged to output the data to a display device. The output connectors U91 and U92 receive the respective data via an output control unit U90.

A person skilled in the art will understand that there are many ways to connect input devices to the input connectors U81, U82 and U83 and the output devices to the output connectors U91 and U92 of the system SYS. These ways comprise, but are not limited to, a wired and a wireless connection, a digital network such as, but not limited to, a Local Area Network (LAN) and a Wide Area Network (WAN), the Internet, a digital telephone network, and an analog telephone network.

In an embodiment, the system SYS comprises a memory unit U70. The system SYS is arranged to receive input data from external devices via any of the input connectors U81, U82, and U83 and to store the received input data in the memory unit U70. Loading the input data into the memory unit U70 allows quick access to relevant data portions by the units of the system SYS. The input data comprises the 3-D image data. The input data may further comprise user input for positioning the TNM overlay or the 3-D geometrical structure and tumor segmentation results such as a binary mask of the tumor positioned in the image data volume, for example. The memory unit U70 may be implemented by devices such as, but not limited to, a register file of a CPU, a cache memory, a Random Access Memory (RAM) chip, a Read Only Memory (ROM) chip, and/or a hard disk drive and a hard disk. The memory unit U70 may be further arranged to store the output data. The output data comprises the tumor image with a superimposed TNM overlay. The memory unit U70 may be also arranged to receive data from and/or deliver data to the units of the system SYS comprising the overlay unit U10, the segmentation unit U20, the first tumor unit U30, the control unit U60, and the user interface U65, via a memory bus U75. The memory unit U70 is further arranged to make the output data available to external devices via any of the output connectors U91 and U92. Storing data from the units of the system SYS in the memory unit U70 may advantageously improve performance of the units of the system SYS as well as the rate of transfer of the output data from the units of the system SYS to external devices.

In an embodiment, the system SYS comprises a control unit U60 for controlling the system SYS. The control unit U60 may be arranged to receive control data from and provide control data to the units of the system SYS. For example, after receiving the 3-D geometrical structure positioning information, the user interface U65 may be arranged to provide control data "the 3-D geometrical structure positioning information is available" to the control unit U60, and the control unit U60 may be arranged to provide control data "compute the position of the 3-D geometrical structure", to the overlay unit U10. Alternatively, control functions may be implemented in other units of the system SYS.

In an embodiment of the system SYS, the system SYS comprises a user interface U65 for enabling communication between a user and the system SYS. The user interface U65 may be arranged to receive a user input comprising the name of the file comprising the 3-D image data and the user input for positioning the 3-D geometrical structure. Optionally, the user interface may receive a user input for selecting a mode of operation of the system SYS such as, for example, for selecting or modifying the 3-D geometrical structure or the TNM overlay based on her/his knowledge of the tumor type. The user interface may be further arranged to display the tumor image with the superimposed TNM overlay. A person skilled in the art will understand that more functions may be advantageously implemented in the user interface U65 of the system SYS.

The invention will be described with reference to breast tumor and breast cancer staging rules (Ref. 1) and MRI 3-D image data. A person skilled in the art will know how to modify the invention to apply it to other cancer types, observation types, imaging modalities and other cancer staging systems. The scope of the claims should not be construed as being limited by the described embodiments.

The TNM rules for staging breast cancer according to Ref. 1 are summarized in Table 1.

TABLE 1

Fragment of TNM rules for staging breast cancer

| Stage | Description |
| --- | --- |
| T1mi | Tumor ≤1 mm in greatest dimension. |
| T1a | Tumor >1 mm but ≤5 mm in greatest dimension. |
| T1b | Tumor >5 mm but ≤10 mm in greatest dimension. |
| T1c | Tumor >10 mm but ≤20 mm in greatest dimension. |
| T2 | Tumor >20 mm but ≤50 mm in greatest dimension. |
| T3 | Tumor >50 mm in greatest dimension |

Figure 1:
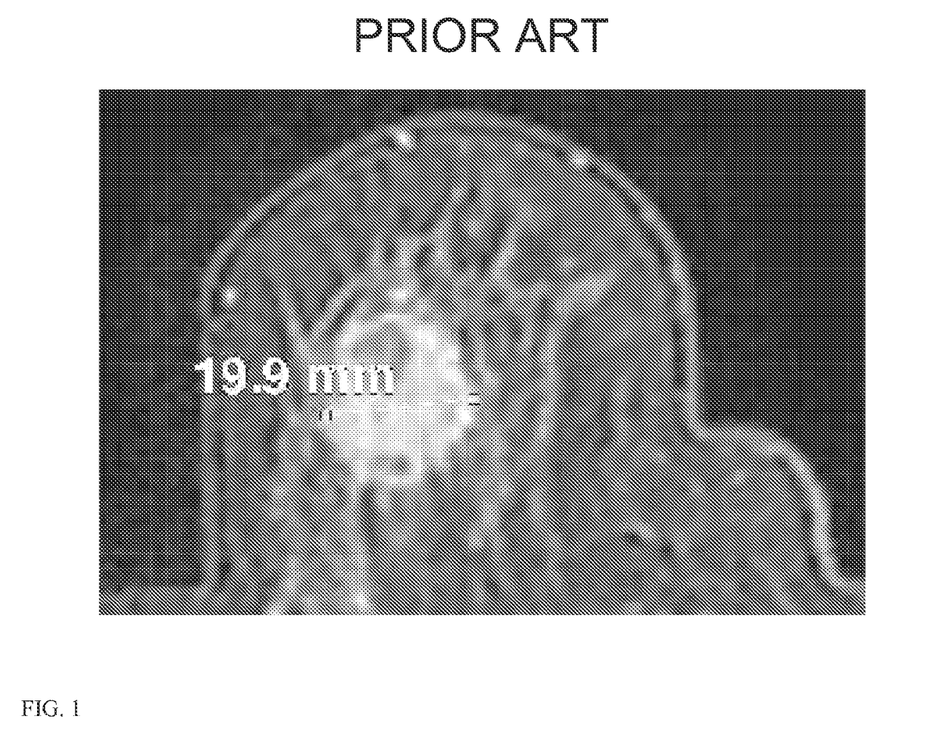
FIG. 1 illustrates measuring a tumor in the breast.

The breast MRI image in FIG. 1 shows a tumor present in the left breast. The shown image is an image obtained from a stack of images. Each image of the stack is computed from an axial image data slice. It is not easy to measure the greatest dimension of the tumor unless the tumor has a substantially spherical shape. Then, the clinician can select one or more images from the stack of images where the tumor shows the greatest dimension, and measure the tumor in the one or more images using a line, as known in the art (see the line in FIG. 1). However, there is no guarantee that the one or more images of the tumor visualize the greatest dimension of the tumor. It may be the case, for example, that the greatest dimension of the tumor is to be found in a non-axial plane. Finding the image showing the greatest dimension of the tumor may require examining many stacks of images, each stack corresponding to a different plane direction defined by a vector normal to the plane, finding one or more images from the stack of images where the tumor shows the greatest dimension and measuring the tumor in the one or more images. Consequently, the process is time-consuming and prone to human error.

In an aspect, the invention provides a system SYS which helps the clinician in determining and visualizing the stage of the tumor. The overlay unit U10 of the system SYS is arranged for positioning a 3-D geometrical structure in the image data volume, wherein the linear sizes of the 3-D geometrical structure are based on a linear scale of the 3-D image data in all dimensions. The scale of multidimensional (e.g., 2-D, 3-D) image data is typically defined by the ratio of the distance between two features of an object represented in the image data volume to the actual distance between the two features of the object. By relating the size of the 3-D geometrical structure to the actual size of the tumor using the scale of the 3-D image data, the 3-D geometrical structure and the tumor are scaled 1:1 with respect to each other. Consequently, the TNM overlay illustrates the actual size of the tumor.

In an embodiment, the 3-D geometrical structure comprises a plurality of concentric spheres. The segmentation unit U20 of the system is arranged for segmenting the tumor. Based on the tumor segmentation, the overlay unit U10 is arranged for computing the center of mass of the tumor for positioning the 3-D geometrical structure. For the sake of the calculation of the center of mass of the tumor, the actual tumor mass distribution is replaced by the tumor image intensity distribution.

Figure 3:
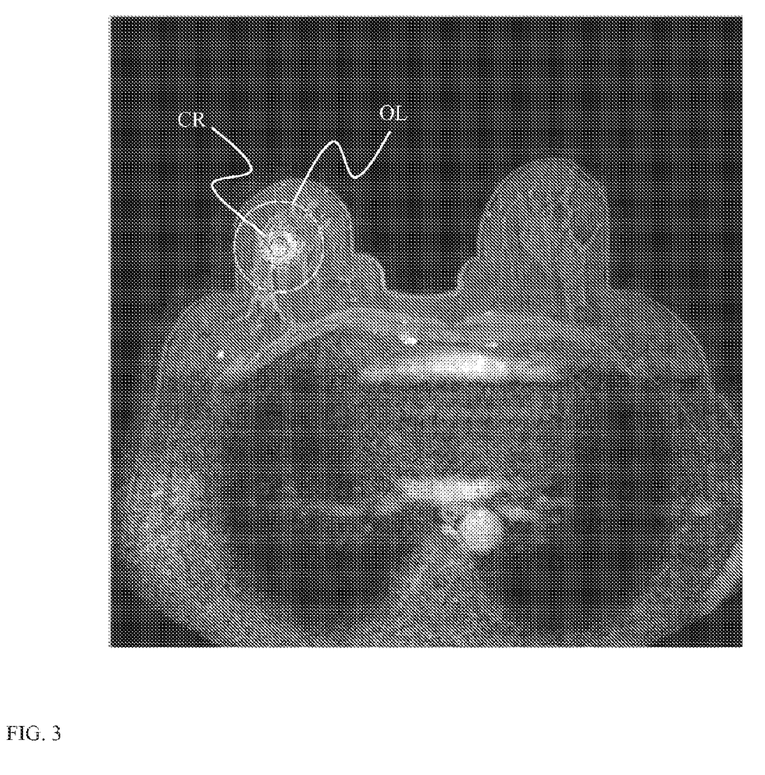
FIG. 3 shows a breast MRI image visualizing a tumor of interest and a superimposed exemplary TNM overlay.

FIG. 3 shows the breast MRI image of FIG. 1, visualizing a tumor CR of interest and a superimposed exemplary TNM overlay OL superimposed on the breast MRI image. The TNM overlay comprises a plurality of concentric circles. The center of the TNM overlay OL corresponds to the center of mass of the tumor CR. The tumor image is computed from the axial image data slice comprising the mass center of the tumor CR. The concentric circles of the TNM overlay OL correspond to the cross-section of the concentric spheres of the 3-D geometric structure positioned in the 3-D image data volume by the axial image data slice.

Figure 4:
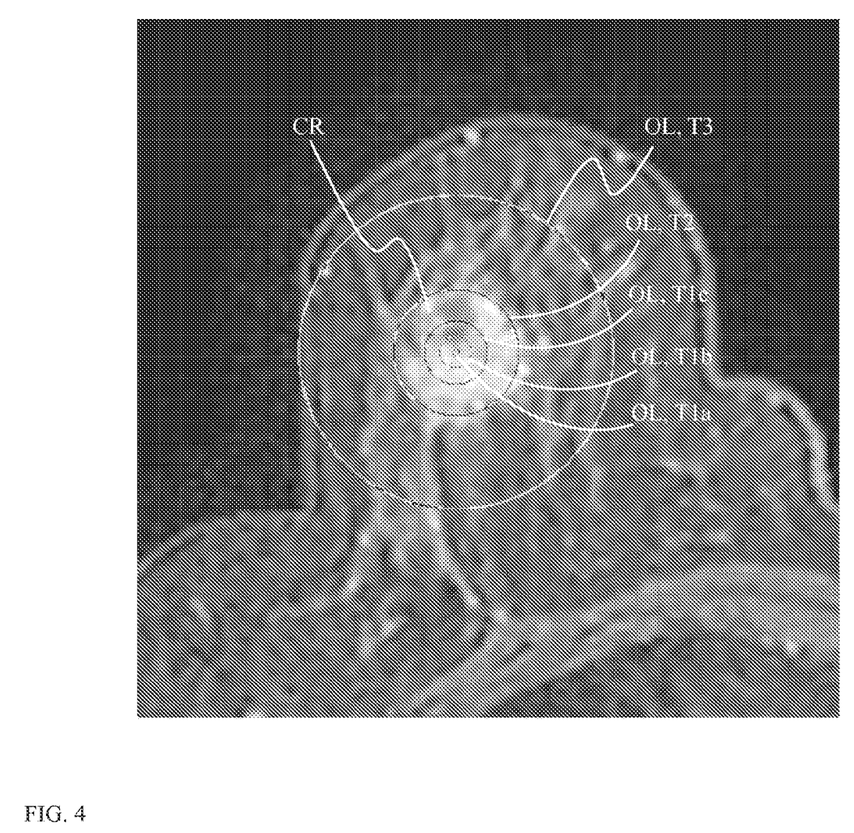
FIG. 4 shows a magnified fragment of the image shown in FIG. 3.

FIG. 4 displays the magnified breast MRI image of FIGS. 1 and 3, i.e., the scale of the magnified image in FIG. 4 is higher. Here the concentric circles of the TNM overlay are labeled according to TNM staging classes listed in Table 1. Based on the image shown in FIG. 3, the clinician can readily realize that the tumor stage is T2. Her/his workflow is thus greatly simplified. In addition, even if the clinician is not familiar with the TNM rules, which are frequently updated, she/he is assisted and trained by the overlay. Thus, in addition to workflow simplification, the system of the invention is helpful in maintaining and spreading the knowledge of the TNM system.

It can be further seen in FIG. 4 that the TNM overlay is adapted based on a property: the image pixel gray values computed from the 3-D image data. The pixels displaying the circles of the TNM overlay are contrasted with the surrounding pixels of the tumor image. When the surrounding pixels of the tumor image are dark (low intensity, low gray values) then the pixel of the TNM overlay is bright (high intensity, high gray value) and vice versa, when the surrounding pixels of the tumor image are bright (high intensity, high gray value) then the pixel of the TNM overlay is dark (low intensity, low gray value). This improves the visibility of the TNM overlay.

In an embodiment, the system SYS comprises a tumor unit U30 for providing additional information to the clinician. The additional information is derived from the 3-D image data and, possibly, from the results of an image analysis algorithm (e.g. the image segmentation results). The tumor volume, shape characteristic, average gray value, etc. may be displayed next to the TNM overlay. Optionally, the circle defined by the smallest sphere enclosing the tumor may be indicated using a distinctive style (e.g. color coding or line width). Optionally, other circles of the TNM overlay OL may be faded out or removed. Also, the user interface U65 of the system can be arranged for receiving free text inputted by the clinician, and the tumor unit U30 may be arranged for including the free text for displaying next to the TNM overlay.

A person skilled in the art will appreciate that the system of the invention may be a valuable tool for assisting a physician in many aspects of her/his job. Further, although the embodiments of the system are illustrated using medical applications of the system, non-medical applications of the system are also contemplated.

Those skilled in the art will further understand that other embodiments of the system SYS are also possible. It is possible, among other things, to redefine the units of the system and to redistribute their functions. Although the described embodiments apply to medical images, other applications of the system, not related to medical applications, are also possible.

The units of the system SYS may be implemented using a processor. Normally, their functions are performed under the control of a software program product. During execution, the software program product is normally loaded into a memory, like a RAM, and executed from there. The program may be loaded from a background memory, such as a ROM, hard disk, or magnetic and/or optical storage, or may be loaded via a network like the Internet. Optionally, an application-specific integrated circuit may provide the described functionality.

Figure 5:
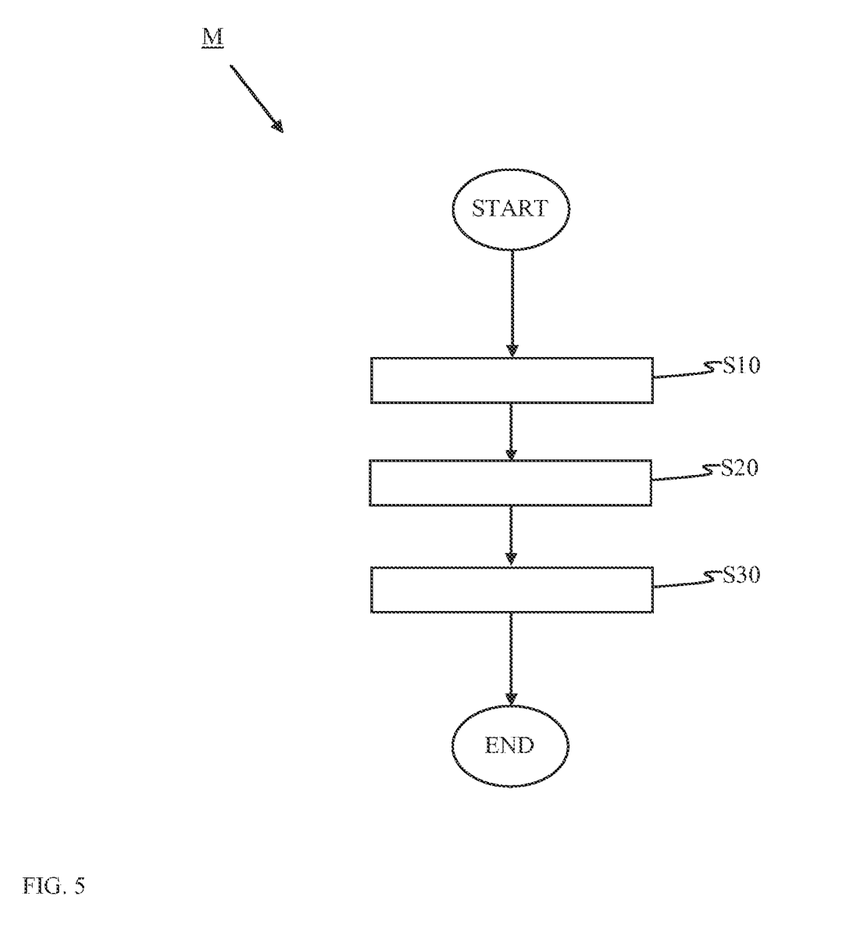
FIG. 5 schematically shows an exemplary flowchart of the method.

FIG. 5 shows an exemplary flowchart of the method M of classifying a malignant tumor based on 3-dimensional image data for visualizing the malignant tumor, wherein the method is arranged for employing an overlay data structure (OL) for computing a TNM (Tumor-Node-Metastasis) overlay for displaying in a tumor image computed from the 3-dimensional image data, and wherein the TNM overlay comprises TNM information for determining the stage of the tumor of interest. The method comprises an overlay step (S10) for computing the TNM overlay based on the overlay data structure (OL) and for positioning the TNM overlay on the tumor image, wherein the size of the TNM overlay is based on the scale of the computed tumor image. Optionally, the method may further comprise a segmentation step S20 for computing a tumor overlay for indicating the tumor of interest on the tumor image, and/or a tumor step S30 for obtaining additional information relating to the tumor, for displaying next to the TNM overlay. The overlay step S10, the segmentation step S20 and the tumor step S30 may be performed concurrently or in any order unless the segmentation step S20 includes tumor segmentation and the segmentation results are used by the overlay step S10 or the tumor step S30. In the latter case, the method M must begin with the segmentation step. After executing all steps included in the method M, the execution of the method terminates. Optionally, two or more steps of the method M may be combined into one step. Optionally, a step of the method M may be split into a plurality of steps.

Figure 6:
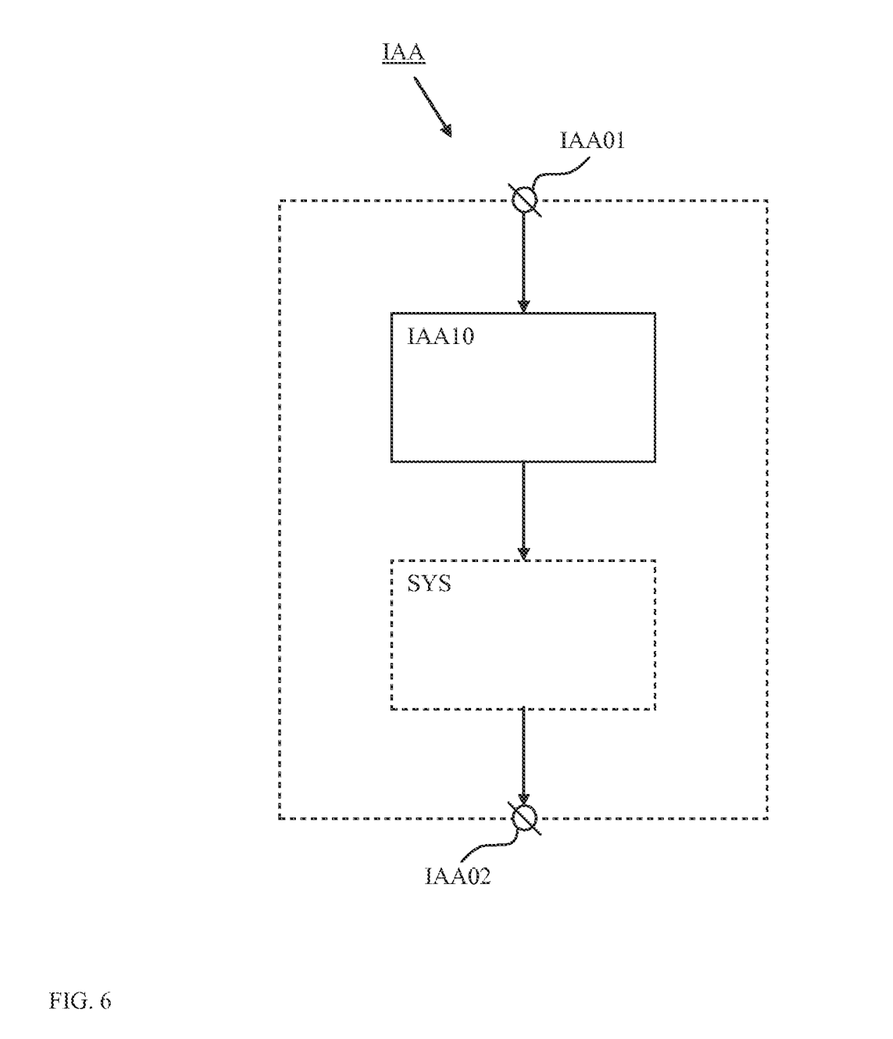
FIG. 6 schematically shows an exemplary embodiment of the image acquisition apparatus.

FIG. 6 schematically shows an exemplary embodiment of the image acquisition apparatus IAA employing the system SYS of the invention, said image acquisition apparatus IAA comprising an image acquisition unit IAA10 connected via an internal connection with the system SYS, an input connector IAA01, and an output connector IAA02. This arrangement advantageously increases the capabilities of the image acquisition apparatus IAA, providing said image acquisition apparatus IAA with advantageous capabilities of the system SYS.

Figure 7:
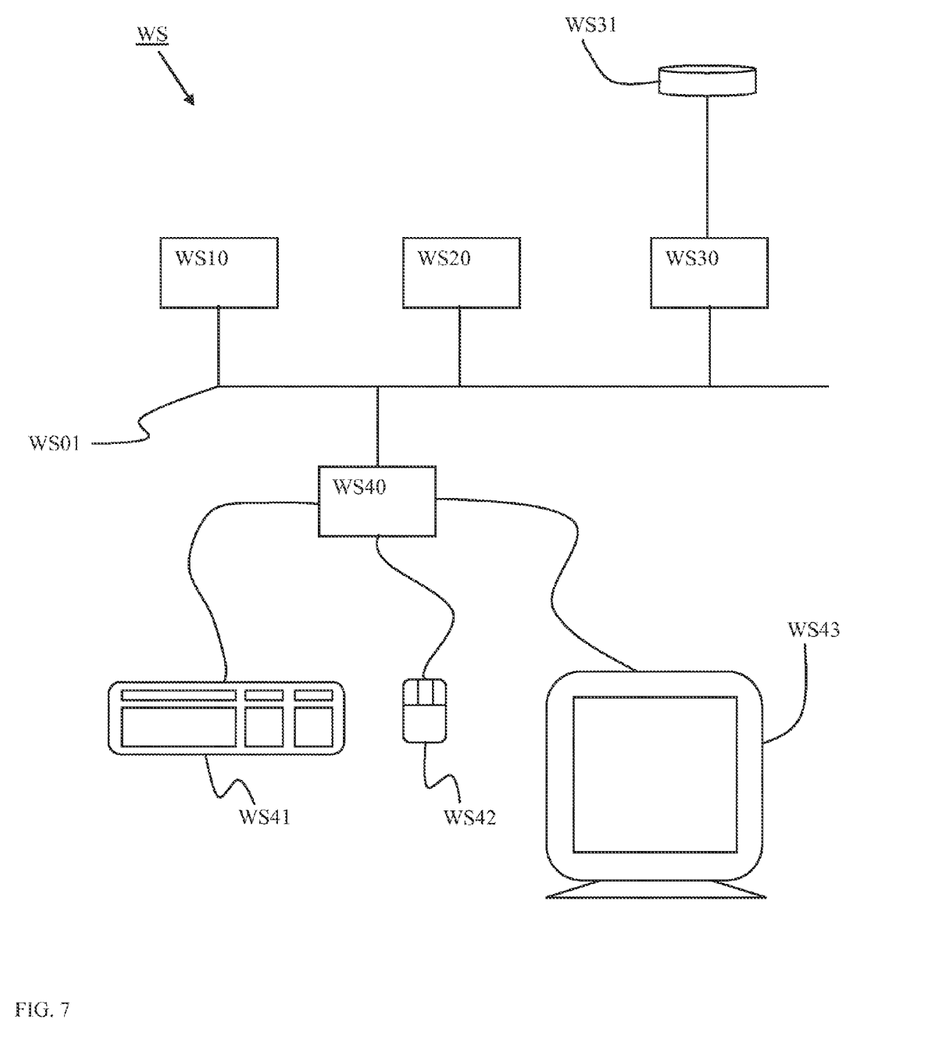
FIG. 7 schematically shows an exemplary embodiment of the workstation.

FIG. 7 schematically shows an exemplary embodiment of the workstation WS. The workstation comprises a system bus WS01. A processor WS10, a memory WS20, a disk input/output (I/O) adapter WS30, and a user interface WS40 are operatively connected to the system bus WS01. A disk storage device WS31 is operatively coupled to the disk I/O adapter WS30. A keyboard WS41, a mouse WS42, and a display WS43 are operatively coupled to the user interface WS40. The system SYS of the invention, implemented as a computer program, is stored in the disk storage device WS31. The workstation WS00 is arranged to load the program and input data into memory WS20 and execute the program on the processor WS10. The user can input information to the workstation WS00, using the keyboard WS41 and/or the mouse WS42. The workstation is arranged to output information to the display device WS43 and/or to the disk WS31. A person skilled in the art will understand that there are numerous other embodiments of the workstation WS known in the art and that the present embodiment serves the purpose of illustrating the invention and must not be interpreted as limiting the invention to this particular embodiment.

It should be noted that the above-mentioned embodiments illustrate rather than limit the invention and that those skilled in the art will be able to design alternative embodiments without departing from the scope of the appended claims. In the claims, any reference signs placed between parentheses shall not be construed as limiting the claim. The word "comprising" does not exclude the presence of elements or steps not listed in a claim or in the description. The word "a" or "an" preceding an element does not exclude the presence of a plurality of such elements. The invention can be implemented by means of hardware comprising several distinct elements and by means of a programmed computer. In the system claims enumerating several units, several of these units can be embodied by one and the same record of hardware or software. The usage of the words first, second, third, etc., does not indicate any ordering. These words are to be interpreted as names.

The invention claimed is:

1. A system for classifying a tumor of interest based on 3-dimensional image data for visualizing the tumor of interest, the system comprising:
    an overlay data structure for computing a Tumor-Node-Metastasis (TNM) overlay for displaying in a tumor image, the tumor image being computed from the image data, wherein the TNM overlay comprises TNM information for determining the stage of the tumor of interest; and
    an overlay unit for computing the TNM overlay based on the overlay data structure and positioning the TNM overlay on the tumor image, wherein the size of the TNM overlay is based on the scale of the computed tumor image.

2. The system as claimed in claim 1, wherein the overlay data structure represents a 3-dimensional geometrical structure, wherein the overlay unit is arranged for positioning the 3-dimensional geometrical structure in the image data volume, wherein the linear sizes of the 3-dimensional geometrical structure are based on a linear scale of the 3-dimensional image data in all dimensions, and wherein the TNM overlay is computed based en the 3-dimensional geometrical structure and the tumor image.

3. The system as claimed in claim 2, wherein the position of the 3-dimensional geometrical structure is computed based on a use input and/or segmentation of the 3-dimensional image data.

4. The system as claimed in claim 2, wherein the overlay unit is further arranged for repositioning the 3 dimensional geometrical structure with respect to the 3-dimensional image data based on a user input, and for updating the position of the TNM overlay according to the new position of the 3-dimensional geometrical structure with respect to the 3-dimensional image data.

5. The system as claimed in claim 2, wherein the 3-dimensional geometrical structure comprises a plurality of concentric spheres or a plurality of concentric cubes.

6. The system as claimed in claim 1, further comprising a segmentation unit for computing a tumor overlay for indicating the tumor of interest on the tumor image.

7. The system as claimed in claim 1, Wherein the overlay unit is further arranged for adapting the TNM overlay, based on a property of the 3-dimensional image data.

8. The system as claimed in claim 1, wherein the overlay unit is further arranged for adapting the TNM overlay based on the type of the tumor of interest.

9. The system as claimed in claim 1, further comprising a tumor unit for:
    indicating the stage of the tumor of interest in the tumor image, based on a user input or segmentation of the 3-dimensional image data; and/or
    communicating the size of the tumor of interest in the tumor image, based on a user input and/or segmentation of the 3-dimensional image data.

10. The system as claimed in claim 2, further comprising means for selecting a view.

11. A workstation comprising a system as claimed in claim 1.

12. An image acquisition apparatus comprising a system as claimed in claim 1.

13. A method of classifying a tumor of interest based on 3-dimensional image data for visualizing the tumor of interest, wherein the method is arranged for employing an overlay data structure for computing a Tumor-Node-Metastasis (TNM) overlay for displaying in a tumor image computed from the 3-dimensional image data, wherein the TNM overlay comprises TNM information for determining the stage of the tumor of interest, the method comprising an overlay step for computing the TNM overlay based on the overlay data structure and for positioning the TNM overlay on the tumor image, wherein the size of the TNM overlay is based on the scale of the computed tumor image.

14. The method as claimed in claim 13, wherein the overlay data structure represents a 3-dimensional geometrical structure, wherein the overlay step is arranged for positioning the 3-dimensional geometrical structure in the image data volume, wherein the linear sizes of the 3-dimensional geometrical structure are based on a linear scale of the 3-dimensional image data in all dimensions, and wherein the TNM overlay is computed based on the 3-dimensional geometrical structure and the tumor image.

15. A non-transitory computer readable medium storing a computer program comprising instructions for classifying a tumor of interest using a Tumor-Node-Metastasis (TNM) overlay for displaying in a tumor image computed from 3-dimensional image data, wherein the TNM overlay comprises TNM information for determining the stage of the tumor of interest, by carrying out the steps of a method as claimed in claim 13.

* * * * *